United States Patent
Delrue et al.

[11] Patent Number: 6,068,873
[45] Date of Patent: May 30, 2000

[54] PROCESS FOR THE PRODUCTION OF MASA FLOUR

[75] Inventors: Rita M. Delrue, Minnetonka, Minn.; Mark D. Burianek, Greenwood, Ind.

[73] Assignee: Cargill, Incorporated, Minneapolis, Minn.

[21] Appl. No.: 09/137,065

[22] Filed: Aug. 20, 1998

[51] Int. Cl.⁷ .............................. A23B 4/03; A23B 4/044
[52] U.S. Cl. ......................... 426/463; 426/479; 426/504; 426/508
[58] Field of Search .................................... 426/455, 458, 426/463, 465, 478, 479, 504, 508

[56] References Cited

U.S. PATENT DOCUMENTS

| | | | |
|---|---|---|---|
| Re. 31,513 | 1/1984 | Glen | 426/521 |
| 198,192 | 12/1877 | d'Heureuse | |
| 1,010,202 | 11/1911 | Thomas | |
| 1,574,210 | 2/1926 | Spaulding | |
| 2,704,257 | 3/1955 | DeSollano et al. | 99/93 |
| 3,035,918 | 5/1962 | Sorgenti et al. | 99/1 |
| 3,159,493 | 12/1964 | Japikse et al. | 99/216 |
| 3,159,494 | 12/1964 | Lawrence et al. | 99/216 |
| 3,194,664 | 7/1965 | Eytinge | 99/80 |
| 3,212,904 | 10/1965 | Gould et al. | 99/93 |
| 3,368,902 | 2/1968 | Berg | 99/83 |
| 3,404,986 | 10/1968 | Wimmer et al. | 99/93 |
| 3,554,772 | 1/1971 | Hankinson et al. | 99/215 |
| 3,653,915 | 4/1972 | Rubio | 99/80 R |
| 3,655,385 | 4/1972 | Rubio | 99/80 R |
| 3,859,452 | 1/1975 | Mendoza | 426/375 |
| 4,221,340 | 9/1980 | dos Santos | 241/7 |
| 4,255,459 | 3/1981 | Glen | 426/521 |
| 4,329,371 | 5/1982 | Hart | 426/375 |
| 4,543,263 | 9/1985 | Goldhahn | 426/520 |
| 4,547,383 | 10/1985 | Goldhahn | 426/524 |
| 4,555,409 | 11/1985 | Hart | 426/424 |
| 4,594,260 | 6/1986 | Vaqueiro et al. | 426/622 |
| 4,770,891 | 9/1988 | Willard | 426/559 |
| 4,844,937 | 7/1989 | Wilkinson et al. | 426/559 |
| 4,882,188 | 11/1989 | Sawada et al. | 426/438 |
| 4,985,269 | 1/1991 | Irvin et al. | 426/560 |
| 4,996,063 | 2/1991 | Inglett | 426/21 |
| 5,176,931 | 1/1993 | Herbster | 426/42 |
| 5,225,224 | 7/1993 | VanNortwick | 426/549 |
| 5,296,253 | 3/1994 | Lusas et al. | 426/629 |
| 5,298,274 | 3/1994 | Khaisa | 426/560 |
| 5,332,594 | 7/1994 | Heller | 426/549 |

(List continued on next page.)

FOREIGN PATENT DOCUMENTS

| | | |
|---|---|---|
| 196464 | 10/1986 | European Pat. Off. . |
| WO 97/29647 | 8/1997 | WIPO . |

OTHER PUBLICATIONS

Watson, S.A., in "Corn: Chemistry and Technology", 1987, *Am. Assoc. Cereal Chemists*, pp. 410–429.

Parades–Lopez, O. et al., "Maize, A revies of tortilla production technology", *Bakers Digest*, Sep. 13, 1983, pp. 16–25.

Khan, M.N. et al., "Corn Tortillas: Evaluation of Corn Cooking Procedures", *Cereal Chem.*, 59:279–284, 1982.

Bedolla, S. et al., "Cooking Maize for Masa Production", *Cereal Foods World*, 27:219–221, 1982.

Bazua, C.D. et al., Extruded Corn as an Alternative to Lime–Heated Corn Flour for Tortilla Preparation, *Inst. Food Technologists*, 1979.

Mensah–Agyapong, J. et al.. "Nixtamalization of Maize (*Zea mays* L) Using a Single Screw Cook–Extrusion Process on Lime–Treated Grits", *J. Sci. Food Agric.*, 60:509–514, 1992.

Martinez et al., "Caracteristics quimicas y usos de harina instantanea de maiz II.", *Archivos Latinoamericanos de Nutrition* 1993, 43, 316–320.

*Primary Examiner*—Nina Bhat
*Attorney, Agent, or Firm*—Fitch, Even, Tabin & Flannery

[57] ABSTRACT

This invention is directed to a continuous process for the production of flour and dough using separate components of cereal grain. Masa flour and dough is made by blending component parts of corn kernels, hydrating the blend, tempering the blend and cooking the tempered blend.

37 Claims, 1 Drawing Sheet

U.S. PATENT DOCUMENTS

| | | | |
|---|---|---|---|
| 5,532,013 | 7/1996 | Martinez-Bustos et al. | 426/496 |
| 5,558,886 | 9/1996 | Martinez-Bustos et al. | 425/376.1 |
| 5,558,898 | 9/1996 | Sunderland | 426/626 |
| 5,589,214 | 12/1996 | Palm | 426/506 |
| 5,652,010 | 7/1997 | Gimmler et al. | 426/549 |
| 5,700,505 | 12/1997 | Hurst | 426/312 |

…

PROCESS FOR THE PRODUCTION OF MASA FLOUR

FIELD OF THE INVENTION

The present invention relates to the making of dough from the component parts of cereal grains. More particularly, this invention is directed to the production of masa flour and dough which is made by blending component parts of corn kernels, hydrating the blend, tempering the blend and cooking the tempered blend.

BACKGROUND OF THE INVENTION

Masa Flour and Dough

Masa flour (dry corn flour which has usually been nixtamalized) and masa (corn dough which has usually been nixtamalized) are raw materials which may be used for the preparation of tortillas, corn chips, tortilla chips, taco shells, nachos, snack foods and similar products.

Nixtamalization is the cooking of cereal grain, such as whole corn kernels, in a medium which usually contains an alkaline agent, such as water containing lime (CaO). Thereafter there is steeping (soaking) of the cereal grain for a period of time, for example, for about three to about fourteen hours, subsequent draining of any remaining cooking liquor, washing of the cereal grains, and grinding of the cereal grains to make with drying a cereal grain flour, which may be added with water to make a cereal grain dough from which tortillas and related products may be prepared.

The production of masa dough with whole corn kernels produces large amount of waste water because of the large amounts of water needed to soften and hydrate whole kernels of corn. Further, using whole kernels of corn for masa limits flexibility for any process where food products are customized for tortillas, tacos, tortilla chips, taco chips and other snack foods which require masa and masa like dough. Using individual component parts of the corn kernel using the process of the invention described herein not only permits customization of masa dough to a particular product using a continuous process without extensive shut down times, but also minimizes or eliminates the amounts of water during the production of the masa.

An object of this invention is to provide a new flexible process for the production of masa flour and dough.

Another object of this invention is to provide a continuous process for the production of masa flour and dough which minimizes or completely eliminates the production of waste water.

These and other objects, advantages, features and characteristics of the present invention will become more apparent upon consideration of the following description and claims.

SUMMARY OF THE INVENTION

This invention is directed to a continuous process for the production of flour and dough using separate components of cereal grain. The process permits the production of cereal flour and dough, and most particularly, masa flour and masa dough from separate components of corn with precise control of the end product that includes changes in the end product without shut down or reduced shut down times, reduced process times, and reduced amounts of or no waste water. Where the process of the invention utilizes corn, it utilizes various component parts of the corn kernel and not the whole kernel. The components utilized include the endosperm as corn flour, corn grits, corn germ and corn bran. In the broadest form, the process includes mixing corn flour with (1) corn germ, or (2) corn grits and corn germ, or (3) corn grits, corn germ and corn bran, or (4) corn germ and corn bran, or (5) corn bran, or (6) corn grits and corn bran, or (7) ground whole corn to provide a corn component blend. Thereafter, the corn component blend is hydrated with water to provide a hydrated corn component blend which has a moisture content of at least about 20 weight percent. In an important aspect of the invention, the process of the invention uses more than one component in the corn component blend, such as corn flour, corn grits, and corn germ for dough to make tacos, tortilla chips and tortilla masa dough. In another important aspect of the invention, the components utilized in the invention are corn flour, corn grits, corn germ and corn bran for taco chips and tortilla chips. In a very important aspect, the components utilized in the invention are corn flour and corn germ for snack foods. Thereafter, the corn component blend is hydrated to provide a hydrated corn component blend which has a moisture content of at least 20 weight percent.

In an important aspect, during hydration, the corn component blend is mixed with water having a temperature of at least about 10° C., but not at a temperature that would substantially gelatinize the starch in the blend. Generally the temperature of the water/corn component blend should not exceed about 60° C. The mixing of the water/corn component blend should be effective to substantially, uniformly distribute water throughout the blend to the moisture level of the at least about 20 weight percent. In another important aspect, the hydrated corn component blend has a moisture content of from about 26 to about 30 weight percent water, based upon the weight of the corn component blend and water.

After hydration, the hydrated corn component blend is tempered for a time to equally distribute moisture throughout the blend. Generally, tempering times range from about 30 seconds to about 12 minutes, depending upon the type and the particle size of the corn components in the hydrated blend.

After tempering, the tempered hydrated corn component blend enters a cooker to cook it in a cooking process which utilizes direct and indirect heat. The indirect heat keeps the cooker and dough at an elevated temperature which is effective for keeping the cooker clean of partially cooked residual dough. The direct heat, such as from the injection of steam into the tempered product, cooks the dough in combination with the indirect heat. The combination of indirect and direct heat brings the temperature of the tempered product to a temperature of at least about 165° F. as it leaves the cooker and partially gelatinizes the starch in the various components in the corn compound blend. After the partial gelatinization not more than about 90 weight percent of the starch in the blend is gelatinized and in an important aspect not more than about 50 weight percent of the starch in the blend is gelatinized. The tempered product is directly exposed to steam for about 1 to about 10 minutes, and preferably from about 1 to about 2 minutes, with the cooking temperature also potentially being affected by a subsequent drying step.

After cooking the cooked corn component, the blend may be dried to a moisture content of not more than about 15 weight percent at a temperature which is effective for not heat damaging or burning the product. Generally, during drying the product temperature should not exceed 95° F. After drying the dried cooked corn component, blend is sized, such as by milling and sifting to a particle size of from about 16 to about 65 mesh, depending upon what type of food product will be made with the corn component blend.

The process of the invention is effective for hydrating, tempering and cooking the corn flour or component blend, such that waste water is not created and process may be carried out without water being removed from the corn flour or component blend after hydrating, tempering or cooking. Moreover, the process is effective for providing a product which does not require washing after the hydration or cooking steps.

In another very important aspect of the invention, the corn grits are hydrated and mixed with water at a water temperature of from about 10 to about 60° C. for about 5 minutes to about 4 hours to prehydrate the corn grits prior to mixing the grits with the corn flour and other ingredients in the corn component blend and prior to hydrating and cooking the corn component blend.

In another important aspect, the corn grits are hydrated in water having a temperature of about 60° C. to about 95° C. for about 5 minutes to 4 hours. The hydrated corn grits can then be mixed with other components after cooking and before drying.

DETAILED DESCRIPTION OF THE INVENTION

Components of the Maize (Corn) Kernel

Figure 1:
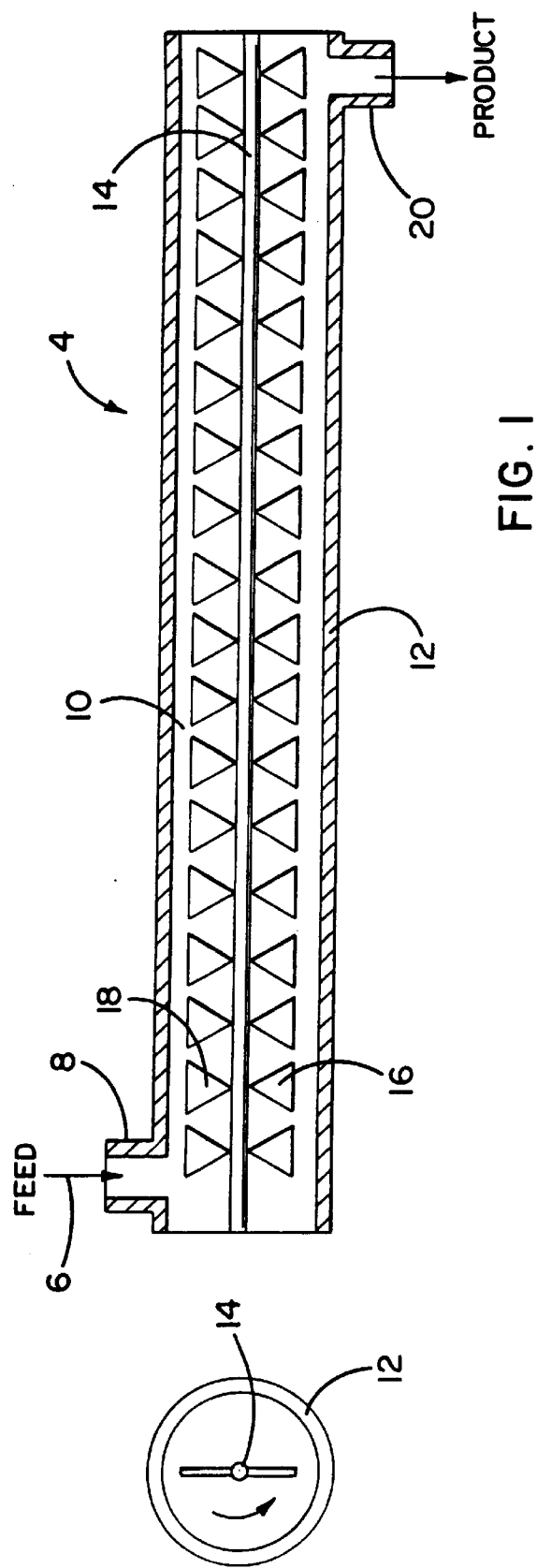
FIG. 1 is a schematic illustration of a cooker used in the process of the invention.

Botanically, a maize kernel is known as a caryposis, a dry, one-seeded, nutlike berry in which the fruit coat and seed are fused to form a single grain. Mature kernels are composed of four major parts: pericarp (hull or bran), germ (embryo), endosperm and tip cap. The average composition of whole maize, and its fractions, on a moisture-free (dry) basis is as follows:

| Fraction of Whole Maize | Kernel % | Starch % | Protein % | Liquid % | Sugar % | Ash % |
|---|---|---|---|---|---|---|
| Whole Grain | 100 | 71.6 | 10.3 | 4.8 | 2.0 | 1.4 |
| Endosperm | 82.3 | 86.4 | 9.4 | 0.8 | 0.6 | 0.3 |
| Germ | 11.6 | 8.2 | 18.8 | 34.5 | 10.8 | 10.1 |
| Pericarp | 5.3 | 7.3 | 3.7 | 1.0 | 0.3 | 0.8 |
| Tip cap | 0.8 | 5.3 | 9.1 | 3.8 | 1.6 | 1.6 |

Pericarp: The maize kernel is covered by a water-impermeable cuticle. The pericarp (hull or bran) is the mature ovary wall which is beneath the cuticle, and comprises all the outer cell layers down to the seed coat. It is high in non-starch-polysaccharides, such as cellulose and pentosans. (A pentosan is a complex carbohydrate present in many plant tissues, particularly brans, characterized by hydrolysis to give five-carbon-atom monosaccharides (pentoses). It is any member of a group of pentose polysaccharides having the formula $(C_5H_8O_4)_n$ found in various foods and plant juices.) Because of its high fiber content, the pericarp is tough.

Germ: The scutulum and the embryonic axis are the two major parts of the germ. The scutulum makes up 90% of the germ, and stores nutrients mobilized during germination. During this transformation, the embryonic axis grows into a seedling. The germ is characterized by its high fatty oil content. It is also rich in crude proteins, sugars, and ash constituents. The scutulum contains oil-rich parenchyma cells which have pitted cell walls. Of the sugars present in the germ, about 67% is glucose.

Endosperm: The endosperm contains the starch, and is lower in protein content than the germ and the bran. It is also low in crude fat and ash constituents.

Tip cap: The tip cap, where the kernel is joined to the cob, is a continuation of the pericarp, and is usually present during shelling. It contains a loose and spongy parenchyma.

The process includes mixing corn flour with (1) corn germ, or (2) corn grits and corn germ, or (3) corn grits, corn germ and corn bran, or (4) corn germ and corn bran, or (5) corn bran, or (6) corn grits and corn bran, or (7) or ground whole corn to provide a corn component blend. The corn component blend may be mixed dry and then mixed with water for hydration of the blend or may be separately mixed into water for hydration of the blend. Thereafter, the corn component blend is hydrated with water to provide a hydrated corn component blend which has a moisture content of at least about 20 weight percent. In an important aspect, if corn grits are used in the component blend, the corn grits are prehydrated prior to the hydration step with the other component or components of the corn component blend. After hydration the process includes tempering the hydrated corn component blend to provide a tempered corn component blend, cooking the blend with indirect heat and direct steam. After cooking, the cooked product with the partially gelatinized starch may be used as a masa dough. In an important aspect, however, this cooked product is dried and optionally milled and sized.

The particle size distribution of corn flour, corn grits and corn bran is as follows.

TABLE I

Percentages of Mesh Sizes

| Mesh Size | Corn Flour | Corn Grits | Corn Bran |
|---|---|---|---|
| >14 mesh | 0 | 2 | 0 |
| >16 mesh | 0 | 86.7 | 0 |
| >20 mesh | 0 | 11 | 0 |
| >40 mesh | 0.2 | 0.3 | 0 |
| >60 mesh | 5.6 | 0 | 8.2 |
| >80 mesh | 27.8 | 0 | 18.7 |
| >100 mesh | 19.4 | 0 | 14.4 |
| <100 mesh | 47 | 0 | 58.7 |
| | 100 | 100 | 100 |

The size of the milled product depends on the type of the application in which the masa flour is to be used. In Table II set forth below, the percentage range of the mesh particle size of the use of the flour is shown in the columns of the Table I below.

TABLE II

Percentages of Mesh Sizes for Product

| Final Product Mesh Size | Chip | Taco | Tortilla | Snack Food |
|---|---|---|---|---|
| >16 mesh | 0–3 | 1–10 | 0 | 0 |
| >20 mesh | 10–26 | 10–35 | trace | trace |
| >40 mesh | n.a. | n.a. | −1.5 | trace |
| >60 mesh | 45 max. | 40 max. | 40 max. | 20–40 |
| <60 mesh | 65 max. | 55 max. | 75 max. | 65–80 |

Hydration Step

The corn component blend is mixed with water in a high-speed mixer. The temperature of the hydrating water varies between about 10° C. to about 95° C. depending if and when prehydrated corn grits are mixed with the other components of the corn component blend. The temperature of the hydrating water depends on the time required for full hydration, and also on the size of the corn grits. The time for the hydration can vary between 5 minutes and 4 hours this time also depending on the size of the hydrated grits and the temperature of water used. The temperature of the hydrating water generally exceeds about 60° C. only when hydrated grits are used and the hydrated grits are added after cooking other components of the corn component blend and the hydrated grits are mixed with these components prior to drying the entire mixture.

When the hydrated grits are mixed with the flour and/or the corn component blend prior to cooking the corn component blend, the temperature of the water varies between about 10° C. and about 60° C., and preferably from about 25° C. to about 60° C. Higher temperatures can be used, but they are not advisable because during the mixing, heating can occur. Any heating which results in substantial gelatinization of the corn starch in any component of the blend should be avoided because such gelatinization will not provide a uniform final product for the cooking step. In this respect, substantial gelatinization means the starch granule structure is disrupted and there is loss of bifringency prior to cooking, such as more than about 5 percent weight percent of the starch in the blend is gelatinized.

In an important aspect of the invention, corn flour, grits, germ and fibers are hydrated with water having a temperature of about 10° C. to about 60° C. In another important aspect, corn flour, germ and fiber are hydrated with water having a temperature of about 10° C. to about 60° C. Corn grits are hydrated separately in for about 5 minutes to about 4 hours with water having a temperature of about 10° C. to about 60° C. The hydrated grits are blended with the corn flour mixture before cooking. Alternatively, grits and corn components can be dried separately and the dry products can be combined.

As noted above, hydrated grits may be mixed with the other corn components after cooking the other components which have been partially gelatinized, such as gelatinized corn flour and bran. In this aspect the hydrated grits are mixed with the cooked corn components, but before drying the mixed components, such as corn flour germ and fiber. In this aspect, the temperature of the water in which the grits are hydrated ranges from about 60° C. to about 95° C. In this aspect, the grits must not only be fully hydrated, but there also must be from about 30 to about 80 percent gelatinization of the starch in the grits.

The preferred mixer for the process is a turbulizer as supplied by Hosokawa Bepex, but other high-speed mixers available can be used. Mixing during hydration is important to substantially uniformly distribute water throughout the whole raw mix. Time is not critical as long as the moisture is substantially evenly distributed throughout the corn component blend to a moisture level of at least about 20 weight percent, in an important aspect, in a range of from about 23 to about 34 weight percent, and preferably about 26 to about 30 weight percent, based upon the weight of the hydrated blend.

During the hydration step, lime can be added dry with a separate feeder or with the water that is used for the hydration. Depending upon the desired final product the amount of lime mixed with the hydrated blend ranges from about 0.00 to about 1.0 weight percent of the hydrated blend.

Hydration of the Grits

In an important aspect, the grits are hydrated prior to the hydration step and prior to mixing the grits with other components of the corn component blend. In this aspect, water is added to the coarse corn grits in a separate device. A low-speed mixer can be used in this step, but also the above-described turbulizer.

Bran

The bran or fiber can be finely ground or pulverized before becoming a part of the corn component blend. It is essential that no large particles are noticeable, as later during the further production of the masa into a dough, this can cause processing problems during the preparation of the masa products.

Tempering

After hydration, the hydrated corn component blend is kept or tempered for a few minutes to make sure the moisture is equally distributed throughout all of the corn component particles. This can be done by methods including the use of a standard transport screw or a tempering vessel. It is not essential, but advisable, to maintain a constant temperature during that process. Tempering times can vary between about 30 seconds and about 12 minutes. Long tempering times are not advisable as microbial growth can occur and are not required as the corn flour particles are small enough to make sure all the water is equally distributed throughout the product and a uniform mixture is obtained for the cooking.

Cooking

The cooker cooks with indirect and direct heat, such as a screw-type cooker and partially gelatinizes the starch in the corn component blend. This cooker, as shown in FIG. 1, is a elongated heating device which has a heat jacket surrounding a channel through which the tempered product is conveyed. The hydrated and tempered product is moved forward down the cooker by means of paddles on a hollow rotor in the device. The rotor is connected to a steam source to transmit steam to the paddles which are hollow and are open to receive steam from the rotor. Steam enters the rotor and is conveyed therethrough into the paddles which have one or more holes from which the steam is injected into the tempered product. The paddles uniformly distribute the steam in the product being cooked. Indirect heat is applied from the jacket of the device. The direct heat brings the tempered product to temperature, partially gelatinizing starch while the indirect heat keeps the cooker and dough at an elevated temperature which is effective for keeping the cooker clean of partially cooked residual dough. Cooking conditions are controlled through selection of a specific length for the device, the number of open steam holes in the paddles, the amount of indirect heat being applied and the rate the tempered product is conveyed through the cooker.

Referring to FIG. 1 for more detail, the tempered product is fed into a elongated heating device 4 shown in FIG. 1. The tempered product is fed into the heating device feed aperture 8 into channel 10. The tempered product is conveyed down channel 10 in the y direction. Channel 10 is surrounded by a steam jacket 12 through which steam is circulated. A hollow rod 14 extends longitudinally down the center of the channel. A plurality of paddles 16 are mounted on the rod 14 down its longitudinal length. The rod 14 is rotated and the paddles are angled such that as the rod rotates the paddles mix, the tempered product and push the product down channel 10. The paddles have openings 18 that extend through the paddles to the hollow center of rod 14. These openings are to transmit steam going through the rod and paddles so that the steam may be injected into the particulate food product being transmitted down channel 10. As the rod rotates the paddles push product down the conduit to exit aperture 20 through which the cooked dough flows. The openings in the paddles may be opened or closed to control steam injection into the product being transmitted down the channel. The amount of steam injected is effective for heating and cooking the product such that a product with partially gelatinized starch is obtained. Additional indirect heating of the tempered product and the cooking channel is done by using indirect heat from the jacket of the device. Enough steam is injected to cook the tempered product and gelatinize the starch therein and to provide the cooked product with a temperature of at least about 165° F. A device which can be used to cook the tempered product as described herein is available as a Solidaire Model SJCS 8-4 from the Hosokawa Bepex Corporation, 333 N.E. Taft Street, Minneapolis, Minn. 55413.

The direct heat, such as from the injection of steam into the tempered product, cooks the dough in combination with the indirect heat. The indirect heat may be provided by steam or oil. The combination of indirect and direct heat brings the temperature of the tempered product to a temperature of at least about 165° F. as it leaves the cooker. The tempered product is directly exposed to steam for about 1 to about 10 minutes, and preferably from about 1 to about 2 minutes, with the cooking time and temperature also potentially being affected by the temperature in the subsequent drying step. When lower temperatures are used during drying, higher temperatures are used during cooking and vice versa.

The cooking temperature as measured by the temperature of the product as it leaves the cooker is a function of the type of the product that is desired and the drying temperatures which are subsequent to the cooking step. When lower drying temperatures are used, such as a flash or a micron dryer, such as when the inlet temperature of the drier is 370° F., significant cooking in the dryer does not occur. When lower drying temperatures are used, the temperature of the cooked product as it leaves the cooker is in the higher end of the range of from about 200° F. to about 210° F. When higher temperatures are used, such as about 500° F. for inlet air temperature, and the temperature of the dried product exceeds 85° C., the cooked product leaves the cooker at the lower end of the latter range, about 165° F. to about 200° F. Overcooking will result in a sticky dough when further processing the masa. During frying of the dough for making a product such as a taco shell, the oil will also be less released resulting in a more oily final product. Undercooking will result in that the formed dough after further processing the masa is not cohesive and will not form the right final product. It will also give a more oily appearance to the fried products.

Before the cooking, hydrated corn products, such as the grits described above, can be added to the product before cooking.

Drying

Conventional techniques, such as a flashdryer or belt dryer, can be used for drying the cooked mixture to provide a product with partially gelatinized starch and a product with a moisture level of not more than about 15 weight percent. Alternatively, a Micron dryer, as supplied by Hosokawa Bepex, may be used. In this system there is also a classifier system which mills the cooked product in such a manner that the right final granulation of the dried masa is obtained for specific applications, such as tortilla and special corn snack foods. For applications where a coarser granulation is required, this air-classification system can be reduced to a minimal level to make sure that still the required coarse particles are present.

The temperatures used during the drying depend upon the temperatures and moisture used during cooking stage. If a high temperature is used during the cooking, a lower temperature can be used during the drying process. If lower temperature and lower moisture levels are used during the cooking, higher temperatures are used during the drying stage to make sure that some cooking is obtained during the drying step. However, a fine balance is kept to prevent the product from heat damage during the drying process. Such heat damage will result in a masa which does not form a proper cohesive dough and which is discolored.

Hydrated corn particles as described in the raw mix can also be added before drying the cooked product. As such a specific balance can be obtained between the level of gelatinized starch in the product and fully hydrated corn particles.

The hydrated corn particles can also be dried in a different drying system (similar as described above) and in the dry form then added to the dried cooked product. Mixing before the drier is not essential.

Sizing of the Dried Product

The dried masa is sifted on a standard sieve to obtain the right granulation. Coarse fractions can be removed and milled to a smaller granulation. Too fine product can be removed if necessary.

The follow examples describe and illustrate the process of the invention and the masa flour and masa dough prepared by the process of the invention.

EXAMPLE I

Production of masa for table tortillas

A blend comprising 92% corn flour and 8% corn germ from white corn is hydrated by mixing the blend with water using a turbulizer. Lime is added into the hydration water. Hydration time is 8 minutes.

The hydrated product then is heated in a Solidaire 6 from Hosokawa Bepex Corporation, paddles open for steam injection. The cooked product then is dried in a Micron dryer with the air classifier obtain product with the correct mesh size. The conditions for the production of masa for table tortillas are set forth below.

| Product Run | 1 | 2 | 3 | 4 | 5 |
| --- | --- | --- | --- | --- | --- |
| Temp. Hydrating H2O | 123 F. | 123 F. | 123 F. | 123 F. | 123 F. |
| Indirect Heat | 213–215 | 213–215 | 213–215 | 213–215 | 213–215 |
| Direct Heat | 265–280 | 265–280 | 265–280 | 265–280 | 265–280 |
| Temp. Time | 8 min. | 8 min. | 8 min. | 8 min. | 8 min. |
| % Lime | 0.2 | 0.2 | 0.2 | 0.2 | 0.2 |
| Cooker Feed Rate (Lb/Hr) | 200 | 200 | 200 | 200 | 200 |
| Hydration % H2O | 30.9 | 30.3 | 31.15 | 30.9 | 29.5 |
| Product Temp. after cooking | 209 | 209 | 209 | 209 | 209 |
| Dryer | Micron | Micron | Micron | Micron | Micron |
| Temp. Outlet ° F. | 180 | 180 | 178 | 179 | 180 |
| RVA 20% d.s. | | | | | |
| 5 minutes | 215 | 254 | 291 | 490 | 319 |
| 12.5 minutes | 205 | 243 | 260 | 496 | 334 |

Cooking time 1.5 minutes.
RVA: rapid visco analyzer. Equipment to measure the viscosity. We make a 20% dry solids solutions and measure over a period of 12.5 minutes the viscosity. Viscosity is expressed in cPoise.

EXAMPLE II

Production of yellow chip masa.

A blend of 70% corn flour, 20% corn grits and 10% germ from yellow corn are mixed as described above and hydrated and cooked according to the conditions described below for the production of yellow chip masa. Cooking time 1.5 minutes.

| Product Run | 1 | 2 | 3 | 4 | 5 |
|---|---|---|---|---|---|
| Temp. Hydrating H2O | 123 F. | 123 F. | 123 F. | 123 F. | 123 F. |
| Indirect Heat ° F. | 214–215 | 214–215 | 214–215 | 214–215 | 214–215 |
| Direct Heat ° F. | 258–270 | 258–270 | 258–270 | 258–270 | 258–270 |
| Temp. Time | 5 min. | 5 min. | 5 min. | 5 min. | 5 min. |
| % Lime | 0 | 0 | 0 | 0 | 0 |
| Cooker Feed Rate (Lb/Hr) | 400 | 400 | 400 | 400 | 400 |
| Hydration % H2O | 25.4 | 26.8 | 26.1 | 26.3 | 29.5 |
| Product Temp. after cooking ° F. | 204 | 204 | 204 | 206 | 204 |
| Dryer Temp. Inlet ° F. | Micron 361 | Micron 370 | Micron 360 | Micron 380 | Micron 370 |
| Temp. Outlet ° F. | 180 | 180 | 180 | 180 | 180 |

EXAMPLE III

White corn tortilla chips.

A blend comprising 70% corn flour, 20% corn grits and 10% corn germ from white corn are mixed and hydrated according to the procedure of Example I and are cooked according to the conditions described below. Cooking time 1.5 minutes.

| Product Run | 1 | 2 | 3 | 4 |
|---|---|---|---|---|
| Temp. Hydrating H2O | 125 F. | 125 F. | 125 F. | 125 F. |
| Indirect Heat | 214–215 | 214–215 | 214–215 | 214–215 |
| Direct Heat | 235–249 | 235–249 | 235–249 | 235–249 |
| Temp. Time | 5 min. | 5 min. | 5 min. | 5 min. |
| % Lime | 0 | 0 | 0 | 0 |
| Cooker Feed Rate (Lb/Hr) | 400 | 400 | 400 | 400 |
| Hydration % H2O | 26 | 28.6 | 28.7 | 26.8 |
| Product Temp. after cooking | 208–209 | 208–209 | 208–209 | 208–209 |
| Dryer Temp. Inlet ° F. | Micron 370 | Micron 360 | Micron 375 | Micron 380 |
| RVA 20% d.s. | | | | |
| 5 minutes | 194 | 153 | 248 | 178 |
| 12.5 minutes | 186 | 131 | 224 | 145 |

EXAMPLE IV

Snack Food

A blend comprising 92% corn flour and 8% corn germ from yellow corn are mixed and hydrated according to the procedure of Example I and are cooked according to the conditions described below for the production of snack food. 1.5 minutes cooking time.

| Product Run | 1 | 2 | 3 | 4 |
|---|---|---|---|---|
| Temp. Hydrating H2O | 95 F. | 95 F. | 95 F. | 95 F. |
| Indirect Heat | 216–217 | 216–217 | 216–217 | 216–217 |
| Direct Heat | 223–225 | 223–225 | 223–225 | 223–225 |
| Temp. Time | 6 min. | 6 min. | 6 min. | 6 min. |
| % Lime | 0.1 | 0.1 | 0.1 | 0.1 |
| Cooker Feed Rate (Lb/Hr) | 300 | 300 | 300 | 300 |
| Hydration % H2O | 31.2 | 31.5 | 31.6 | 30.5 |
| Product Temp. after cooking | 206 | 208 | 207 | 206 |
| Dryer Temp. Inlet ° F. | Micron 390 | Micron 380 | Micron 375 | Micron 390 |
| RVA 20% d.s. | | | | |
| 5 minutes | 324 | 365 | 326 | 429 |
| 12.5 minutes | 359 | 415 | 351 | 462 |

EXAMPLE V

Whole ground white corn for table tortilla applications.

| Product Run | 1 | 2 | 3 | 4 |
|---|---|---|---|---|
| Temp. Hydrating H2O | 95 F. | 95 F. | 95 F. | 95 F. |
| Indirect Heat | 213–220 | 213–220 | 213–220 | 213–220 |
| Direct Heat | 250–260 | 250–260 | 250–260 | 250–260 |
| Temp. Time | 8 min. | 8 min. | 8 min. | 8 min. |
| % Lime | 0.2 | 0.2 | 0.2 | 0.2 |
| Cooker Feed Rate (Lb/Hr) | 200 | 200 | 200 | 200 |
| Hydration H2O | 31.2 | 31.6 | 31.9 | 32.8 |
| Product Temp. after cooking | 207 | 205 | 207 | 204 |
| Dryer Temp. Inlet ° F. | Micron 400 | Micron 420 | Micron 410 | Micron 400 |
| RVA 20% d.s. | | | | |
| 5 minutes | 598 | 386 | 459 | 435 |
| 12.5 minutes | 359 | 412 | 448 | 434 |

EXAMPLE VI

Presoaking Procedure For Masa

Yellow Corn. Grits from yellow corn are hydrated before for 2 hours with hot water (95° C.) with continuous mixing. Amount water was calculated as to obtain 30% moisture in the grits after 2 hours and no excess of waste water. The hydrated grits, corn flour and corn germ were mixed to provide a blend comprising 20 wt. % hydrated grits, 8 wt. % corn germ and corn flour, calculated on dry basis.

| Product Run | 1 | 2 | 3 | 4 |
|---|---|---|---|---|
| Temp. Hydrating H2O | 95 F. | 95 F. | 95 F. | 95 F. |
| Indirect Heat | 212 | 212 | 212 | 212 |
| Direct Heat | 258–272 | 258–272 | 258–272 | 258–272 |
| Temp. Time | 5 min. | 5 min. | 5 min. | 5 min. |
| % Lime | 0.15 | 0.15 | 0.15 | 0.15 |
| Cooker Feed Rate (Lb/Hr) | 430 | 430 | 430 | 430 |
| Hydration % H2O | 28 | 26.7 | 27.2 | 28 |
| Product Temp. after cooking | 209 | 209 | 209 | 209 |

-continued

| Product Run | 1 | 2 | 3 | 4 |
|---|---|---|---|---|
| Dryer Temp. Inlet | Micron | Micron | Micron | Micron |
| RVA 25% d.s. | | | | |
| 5 minutes | 897 | 1,148 | 1,230 | 1,454 |
| 12.5 minutes | 889 | 1,209 | 1,262 | 1,513 |

The hydration moisture is the moisture of the mixture corn flour and grits before the hydrated grits is added. Moisture of the hydrated grits was 30–31%.

EXAMPLE VII

Yellow tortilla chips

A blend comprising 30% corn grits, 8% corn germ and 62% corn flour were mixed, hydrated and cooked as described in Example I. Cooking time was 1.5 minutes.

| Product Run | 1 | 2 | 3 | 4 |
|---|---|---|---|---|
| Temp. Hydrating H2O | 80 | 80 | 80 | 80 |
| Indirect Heat | 213–216 | 213–216 | 213–216 | 213–216 |
| Direct Heat | 240–263 | 249–263 | 249–263 | 249–263 |
| Temp. Time | 5 min. | 5 min. | 5 min. | 5 min. |
| Cooker Feed Rate (Lb/Hr) | 400 | 400 | 400 | 400 |
| Hydration % H2O | 28.42 | 28.2 | 25.4 | 27.6 |
| Product Temp. after cooking | 207 | 209 | 192 | 193 |
| Dryer Temp. Inlet ° F. | Micron 380 | Micron 378 | Flash 504 | Flash 529 |
| RVA 25% d.s. | | | | |
| 5 minutes | 1,148 | 1,511 | 997 | 1,325 |
| 12.5 minutes | 1,293 | 1,704 | 1,076 | 1,533 |

What is claimed is:

1. A process for making masa flour comprising:

mixing corn flour and a second corn component selected from the group consisting of (1) corn germ, (2) corn grits and corn germ, (3) corn grits, corn germ and corn bran, (4) corn germ and corn bran, (5) corn bran, (6) corn grits and corn bran, (7) ground whole corn and mixtures thereof to provide a corn component blend;

hydrating the corn component blend with water to a moisture level of at least about 20 weight percent, based upon the weight of the corn component blend and water to provide a hydrated corn component blend;

tempering the hydrated corn component blend for at least about 30 seconds to provide a tempered corn component blend;

cooking the tempered corn component blend with indirect heat and the direct application of steam to bring the tempered corn component blend to a temperature of at least about 165° F. to provide a cooked corn component blend.

2. The process as recited in claim 1 further comprising drying the cooked corn component blend to a moisture content of not more than about 15 weight percent moisture to provide a dried, cooked corn component.

3. The process as recited in claim 2 further comprising sizing the cooked corn component blend to provide a sized cooked corn component blend having a particle size of from about 16 mesh to about 60 mesh.

4. A process as recited in claim 1 wherein the corn grits are hydrated in water for at least about 20 minutes at a temperature of at least about 10° C. to provide hydrated corn grits and mixing the hydrated corn grits with the corn flour prior to cooking the corn component blend.

5. A process as recited in claim 1 wherein the water during the hydration of corn component blend has a temperature of at least about 10° C. and the corn component blend and water are mixed at a rate which is effective for distributing the water is substantially uniformly distributed throughout the corn component blend.

6. A process as recited in claim 1 wherein the corn component blend is corn flour, corn grits and corn germ.

7. A process as recited in claim 1 wherein the corn component blend is corn flour, corn grits, corn germ and corn bran.

8. A process as recited in claim 1 wherein the corn component blend is corn flour and corn germ.

9. A process for making masa flour comprising:

mixing corn flour and a second corn component selected from the group consisting of (1) corn germ, (2) corn grits and corn germ, (3) corn grits, corn germ and corn bran, (4) corn germ and corn bran, (5) corn bran, (6) corn grits and corn bran, (7) ground whole corn and mixtures thereof to provide a corn component blend;

hydrating the corn component blend with water to a moisture level of at least about 20 weight percent, based upon the weight of the corn component blend and water to provide a hydrated corn component blend;

tempering the hydrated corn component blend for at least about 30 seconds to provide a tempered corn component blend;

cooking the tempered corn component blend with indirect heat and direct heat to partially gelatinize starch in the blend such that not more than about 90 weight percent of the starch is gelatinized.

10. The process as recited in claim 9 further comprising drying the cooked corn component blend to a moisture content of not more than about 15 weight percent moisture to provide a dried, cooked corn component.

11. The process as recited in claim 10 further comprising sizing the cooked corn component blend to provide a sized cooked corn component blend having a particle size of from about 16 mesh to about 60 mesh.

12. A process as recited in claim 9 wherein the corn grits are hydrated in water for at least about 20 minutes at a temperature of at least about 10° C. to provide hydrated corn grits and mixing the hydrated corn grits with the corn flour prior to cooking the corn component blend.

13. A process as recited in claim 9 wherein the water during the hydration of corn component blend has a temperature of at least about 10° C. and the corn component blend and water are mixed at a rate which is effective for distributing the water is substantially uniformly distributed throughout the corn component blend.

14. A process as recited in claim 9 wherein the corn component blend is corn flour, corn grits and corn germ.

15. A process as recited in claim 9 wherein the corn component blend is corn flour, corn grits, corn germ and corn bran.

16. A process as recited in claim 9 wherein the corn component blend is corn flour and corn germ.

17. A process as recited in claim 9 wherein the corn component blend is brought to a temperature of at least about 165° F.

18. A process as recited in claim 9 wherein not more than about 50 weight percent of the starch in the corn component blend is gelatinized.

19. A process for making masa flour comprising:
mixing corn flour and a second corn component selected from the group consisting of (1) corn germ, (2) corn grits and corn germ, (3) corn grits, corn germ and corn bran, (4) corn germ and corn bran, (5) corn bran, (6) corn grits and corn bran, (7) ground whole corn and mixtures thereof to provide a corn component blend;
hydrating the corn component blend with water to a moisture level of from about 20 weight percent to about 34 weight percent water, based upon the weight of the corn component blend and water to provide a hydrated corn component blend;
tempering the hydrated corn component blend for at least about 30 seconds to provide a tempered corn component blend; and
cooking the tempered corn component blend with indirect heat and the direct application of steam to bring the tempered corn component blend to a temperature of at least about 165° F. to provide a cooked corn component blend such that not more than about 90 weight percent of the starch is gelatinized.

20. The process as recited in claim 19 further comprising drying the cooked corn component blend to a moisture content of not more than about 15 weight percent moisture to provide a dried, cooked corn component.

21. The blend process as recited in claim 20 further comprising sizing the dried cooked corn component blend to provide a sized dried cooked corn component blend having a particle size of from about 16 mesh to about 60 mesh.

22. A process as recited in claim 19 wherein the corn grits are hydrated in water for at least about 20 minutes at a temperature of at least about 10° C. to provide hydrated corn grits and mixing the hydrated corn grits with the corn flour prior to cooking the corn component blend.

23. A process as recited in claim 19 wherein the water during the hydration of corn component blend has a temperature of at least about 10° C. and the corn component blend and water are mixed at a rate which is effective for distributing the water is substantially uniformly distributed throughout the corn component blend.

24. A process as recited in claim 19 wherein the corn component blend is corn flour, corn grits and corn germ.

25. A process as recited in claim 19 wherein the corn component blend is corn flour, corn grits, corn germ and corn bran.

26. A process as recited in claim 19 wherein the corn component blend is corn flour and corn germ.

27. A process for making masa flour comprising:
mixing corn flour and a second corn component selected from the group consisting of (1) corn germ, (2) corn grits and corn germ, (3) corn grits, corn germ and corn bran, (4) corn germ and corn bran, (5) corn bran, (6) corn grits and corn bran, (7) ground whole corn and mixtures thereof to provide a corn component blend;
hydrating the corn component blend with water to a moisture level of at least about 20 weight percent, based upon the weight of the corn component blend and water, at a temperature of from about 10° C. to about 60° C. to provide a hydrated corn component blend with the starch in the hydrated corn component blend not being substantially gelatinized;
tempering the hydrated corn component blend for at least about 30 seconds to provide a tempered corn component blend; and
cooking the tempered corn component blend with a heat source which includes the direct application of steam onto the blend to heat the blend to a temperature of at least about 165° F. to provide a cooked corn component blend such that not more than about 90 weight percent of the starch is gelatinized.

28. The process as recited in claim 27 further comprising drying the cooked corn component blend to a moisture content of not more than about 15 weight percent moisture to provide a dried, cooked corn component and sizing the dried cooked corn component blend to provide a sized cooked corn component blend having a particle size of from about 16 mesh to about 60 mesh.

29. A process as recited in claim 27 wherein the water during the hydration of corn component blend has a temperature of at least about 10° C. and the corn component blend and water are mixed at a rate which is effective for distributing the water is substantially uniformly distributed throughout the corn component blend.

30. A process as recited in claim 27 wherein the corn component blend is corn flour, corn grits and corn germ.

31. A process as recited in claim 27 wherein the corn component blend is corn flour, corn grits, corn germ and corn bran.

32. A process as recited in claim 27 wherein the corn component blend is corn flour and corn germ.

33. A process as recited in claim 27 wherein the corn component blend is corn flour, corn grits and corn bran.

34. A process as recited in claim 27 wherein not more than about 50 weight percent of the starch in the corn component blend is gelatinized.

35. A process as recited in claims 30, 31 or 33 wherein the corn grits are pre-hydrated prior to mixing the grits with other components of the blend.

36. A process as recited in claims 27 or 34 wherein the process further comprises drying the cooked corn component blend to a moisture content of not more than about 15 weight percent moisture to provide a dried, cooked corn component and sizing the dried cooked corn component blend to provide a sized dried cooked corn component blend having a particle size of from about 16 mesh to about 60 mesh.

37. A process for making masa flour comprising:
mixing corn flour and a second corn component selected from the group consisting of (1) corn germ, (2) corn grits and corn germ, (3) corn grits, corn germ and corn bran, (4) corn germ and corn bran, (5) corn bran, (6) corn grits and corn bran, (7) ground whole corn and mixtures thereof to provide a corn component blend;
hydrating the corn component blend with water to a moisture level of at least about 20 weight percent, based upon the weight of the corn component blend and water, at a temperature of from about 10° C. to about 60° C. to provide a hydrated corn component blend with the starch in the hydrated not being substantially gelatinized;

tempering the hydrated corn component blend for at least about 30 seconds to provide a tempered corn component blend;

cooking the tempered corn component blend with indirect heat and direct application of steam to heat the blend to a temperature of at least about 165° F. to provide a cooked corn component blend such that not more than about 90 weight percent of the starch is gelatinized;

drying the cooked corn component blend to a moisture content of not more than about 15 weight percent moisture to provide a dried, cooked corn component; and sizing the dried cooked corn component blend to provide a sized cooked corn component blend having a particle size of from about 16 mesh to about 60 mesh.

* * * * *